United States Patent [19]

de Seze et al.

[11] Patent Number: 5,822,315
[45] Date of Patent: Oct. 13, 1998

[54] AIR INTERFACE ADAPTING METHOD FOR A MOBILE RADIO SYSTEM

[75] Inventors: Fabrice de Seze, Paris; Marc Delprat, Le Chesnay; Christophe Mourot, Asnieres, all of France

[73] Assignee: Alcatel CIT, Paris, France

[21] Appl. No.: 716,299

[22] PCT Filed: Mar. 27, 1995

[86] PCT No.: PCT/FR95/00381

§ 371 Date: Sep. 24, 1996

§ 102(e) Date: Sep. 24, 1996

[87] PCT Pub. No.: WO95/27345

PCT Pub. Date: Oct. 12, 1995

[30] Foreign Application Priority Data

Mar. 31, 1994 [FR] France .................................. 94 03860

[51] Int. Cl.⁶ ....................................................... H04J 3/16
[52] U.S. Cl. ........................ 370/337; 370/347; 370/437; 370/468
[58] Field of Search ..................................... 370/437, 336, 370/465, 468, 470, 537, 337, 347, 321, 458, 442, 252, 498, 466; 455/450, 451, 452, 453, 454, 517, 509, 510, 511, 512, 513, 514; 340/825, 825.03, 825.04

[56] References Cited

U.S. PATENT DOCUMENTS

| | | |
|---|---|---|
| 5,214,687 | 5/1993 | Kansakoski et al. . |
| 5,481,537 | 1/1996 | Gisler et al. ............................. 370/437 |
| 5,619,496 | 4/1997 | Weir ........................................ 370/468 |
| 5,644,576 | 7/1997 | Bauchot et al. ......................... 370/437 |

FOREIGN PATENT DOCUMENTS

| | | |
|---|---|---|
| 0428199A3 | 5/1991 | European Pat. Off. . |
| 0538546A3 | 4/1993 | European Pat. Off. . |
| 2253546 | 9/1992 | United Kingdom . |
| WO9314584 | 7/1993 | WIPO . |
| WO9401956 | 1/1994 | WIPO . |
| WO9405095 | 3/1994 | WIPO . |

Primary Examiner—Huy D. Vu
Attorney, Agent, or Firm—Sughrue, Mion, Zinn, Macpeak & Seas, PLLC

[57] ABSTRACT

A mobile radio system conveys frames between at least one mobile station and at least one base station, each frame comprising N time slots, a burst of data being transmitted in each time slot, and each time slot being associated with a separate call between a mobile station and a base station. For each call over a transmission channel, the quality of the transmission channel is analyzed and, on the, basis thereof, a selection is made between first and second modes of transmission. In the first mode of transmission data to be transmitted is organized in first blocks obtained by a first encoding of source blocks, each of the first blocks has a size greater than the content of (P−1) bursts, where P is an even number at least equal to 2, and the data of the same first block is distributed between at least P bursts. In the second mode of transmission the data to be transmitted is organized in second blocks each having a size less than or equal to the content of P/2 bursts, the data of the same second block is distributed into at most P/2 bursts, at least P/2 bursts are available relative to the first mode of transmission, and an automatic retransmission request mechanism is used to retransmit in the available bursts second blocks that are detected to have been received incorrectly. This second mode of transmission necessitates a quality of the transmission channel greater than that necessitated by the first mode of transmission.

16 Claims, 3 Drawing Sheets

AIR INTERFACE ADAPTING METHOD FOR A MOBILE RADIO SYSTEM

BACKGROUND OF THE INVENTION

Field of the Invention

The field of the invention is that of digital mobile radio systems. The invention applies in particular to cellular mobile radio systems such as GSM (Global System for Mobile communications) systems.

More particularly, the invention concerns the communication of digital data in systems utilizing time-division multiplexing, employing the TDMA (Time Division Multiple Access) technique.

The TDMA technique divides time into frames of predetermined fixed duration, the frames being in turn divided into time slots. One or more time slots are associated with each call. A burst can be transmitted in each time slot.

A frame comprises N time slots (i.e. N bursts) that can correspond to N calls. Each receiver is able to extract the bursts corresponding to the time slots that are addressed to it, in order to reconstruct the source signal. In this way, N calls can be transmitted in the same frequency band.

After transmission on a radio channel, in particular a mobile radio channel using frequency hopping and with a quasirandom distribution of the interference signals, the quality of the frames (and therefore of the bursts that they contain) is variable. The transmission channel may be subject to various disturbances, including rapid fading and impulsive interference, which cause sequences of errors in the frames.

To attempt to solve this problem, in one standard mode of transmission the data to be transmitted is organized into source blocks and is encoded and then distributed (i.e. interleaved) into bursts each of which belongs to a separate frame.

The encoding process, usually called error control coding or channel coding, is intended to protect the wanted data to be transmitted by judiciously converting it into encoded data. An encoded block is generally larger than a source block. At the receiver, the encoded data is processed to recover the wanted data, even in the presence of transmission errors due to the poor quality of the transmission channel.

The interleaving that follows encoding consists in dividing the data of the same encoded block between several bursts belonging to separate frames, so that they are transmitted at separate times. At the receiver, decoding is preceded by deinterleaving which breaks up the series of errors and, ideally, produces isolated errors that are more easily corrected upon decoding the codes used.

In the standard mode of transmission this interleaving, i.e. the distribution of the data from the same encoded block between several bursts, is mandatory since the size of the encoded blocks means that it is not possible to place all of an encoded block in one burst, in particular because they contain a relatively large amount of redundant data. The encoding process, and thus the amount of redundant data, are chosen to enable correct decoding when transmission channel quality is poor (i.e. in the worst case scenario).

This standard mode of transmission has various disadvantages, even though it enables effective and correct exchange of data regardless of the quality of the transmission channel.

First of all, it is clear that the standard mode of transmission, being designed to work in the worst case scenario, is not optimized when the transmission channel quality is reasonably good.

The interleaving at the transmitter implies a time-delay at the receiver which can be relatively large, since the corresponding deinterleaving process presupposes the arrival of several successive frames before an encoded block can be reconstituted.

An object of the invention is to overcome these various disadvantages of the prior art.

To be more precise, one object of the present invention is to provide a method of adapting the air interface in a mobile radio system to optimize the exchange of data bursts contained in frames, and in particular to reduce the amount of data transmitted.

Another object of the invention is to provide a method of this kind that reduces the time-delays.

A further object of the invention is to provide a method of this kind enabling the use of transmission resources (i.e. channels) to be optimized and thus to limit the interference induced in nearby cells using the same frequency band. This object of reducing interference is particularly important in cellular mobile radio systems. In these systems, the same frequency band is allocated to several geographically dispersed cells. Although the distribution of the latter is defined in a way that maximizes the distance between the cells, it is not rare for the signals of a given cell to experience interference from those of other cells using the same band.

SUMMARY OF THE INVENTION

These objects, and others that emerge hereinafter, are achieved in accordance with the invention by means of a method of adapting air interface, in a mobile radio system conveying, between at least one mobile station and at least one base station frames each made up of N time slots, a burst of data being transmitted in each time slot, each time slot being associated with a separate call between a mobile station and a base station, said system providing a first mode of transmission in which the data of a call to be transmitted is organized in first blocks obtained by first encoding of source blocks, each of said first blocks having a size greater than the content of (P−1) burst(s) where P is an even number at least equal to 2, the data of the same first block being divided between at least P bursts, said system providing a second mode of transmission in which the data of a call to be transmitted is organized in second blocks each having a size less than or equal to the content of P/2 burst(s), the data of the same second block being divided between at most P/2 burst (s), at least P/2 burst(s) being available relative to the first mode of transmission, and an automatic retransmission request mechanism being implemented to retransmit in said available bursts second blocks detected to have been received incorrectly, and, for each call between a mobile station and a base station via a transmission channel, the quality of said transmission channel is analyzed and one of said modes of transmission is selected according to said analysis of said quality of the transmission channel, said second mode of transmission necessitating a level of quality of the transmission channel greater than that necessitated by said first mode of transmission.

The principle of the invention is therefore to use selectively either a first or a second mode of transmission. The first mode of transmission corresponds to the standard mode of transmission previously discussed. The second mode uses the burst by burst ARQ (Automatic Repeat Request) transmission technique. Thus the invention takes advantage of the fact that, with a channel of sufficient quality, the "burst by burst ARQ" technique (second mode of transmission) is more efficient than the encoding-interleaving technique (first mode of transmission).

In other words, if the quality of the channel is sufficient, the second mode of transmission is selected and the exchange of data is optimized:

the amount of data transmitted is reduced since there is no encoding (and therefore no redundancy) or only "light" encoding (leading to less redundancy than the encoding process used is the first mode of transmission); note that minimal encoding is generally retained in order to enable error detection; and the time-delays are reduced since there is no (or less) interleaving (instead of distribution into at least P bursts (i.e. at least P frames) there is distribution into at most P/2 bursts (i.e. P/2 frames)); sufficient channel quality is obtained, for example, in an indoor environment.

When the quality of the channel is somewhat poor, on the other hand, the first mode of transmission is more suitable since, by using "robust" encoding and deeper interleaving, it can correct a relatively large number of errors.

The "burst by burst ARQ" technique is usually implemented in the following manner: the time interval Δt separating the sending of two successive bursts is of constant duration, except when a burst is retransmitted. In this case, if the nth burst (for example) is detected to have been received incorrectly, it is retransmitted at the time intended for transmitting the (n+1)th burst (i.e. Δt after transmission of the nth burst). An additional transmission resource is therefore freed during a subsequent time slot so that the (n+1)th burst is transmitted before the time intended for the (n+2)th burst, which is transmitted on schedule 2Δt after transmission of the nth burst.

In the advantageous embodiment of the invention, the "burst by burst ARQ" technique is implemented differently. In the second mode of transmission each frame comprises one burst for each call and there are at least P/2 bursts available. These available bursts can therefore be used to retransmit bursts detected to have been received incorrectly. In other words, the system does not have to free any additional transmission resource and all the bursts (including those that are retransmitted) can be transmitted at regular time intervals (i.e. every wanted frame, unless retransmission is required). If the nth packet is detected to have been received incorrectly, for example, it is retransmitted during the time slot intended for transmission of the (n+1)th burst, this time slot being available since the change from the first mode of transmission to the second frees bursts (i.e. time slots). The (n+2)th burst can therefore be transmitted normally 2Δt after the transmission of the nth burst.

Moreover, in this advantageous embodiment of the invention interference is limited since one burst in two is not used (unless a second block has to be retransmitted) and therefore cannot generate interference.

Said mobile radio system is advantageously of the GSM (Global System for Mobile communications) type and said second mode of transmission is advantageously of the half-rate type, a second block having a size less than or equal to the content of a burst, only one frame in two being used for a given call.

In this case, a second block is sufficiently small to fit in a burst. Over a series of four consecutive frames, a given time slot in the first and third frames is assigned to a first call and the same time slot in the second and fourth frames is assigned to a second call. For the first call, for example, the advantageous embodiment of the invention places in the corresponding time slot of the first frame a burst containing a second block, the corresponding time slot of the third frame being either empty or used to retransmit in a burst the second block previously transmitted in the first frame if the second block is detected to have been received incorrectly.

The data from the same first block is advantageously divided between at least four bursts. The data from the same second block is in the same burst.

Said first mode of transmission is preferably selected from:

a full-rate type first mode of transmission in which a first block has a size substantially equal to the content of four bursts, the data of the same first block being distributed between eight bursts, at the rate of approximately one eighth of the first block per burst;

a half-rate type first mode of transmission in which a first block has a size substantially equal to the content of two bursts, the data of the same first block being divided into four bursts, at the rate of approximately one quarter of said first block per burst, only one frame in two being used for the same call.

In other words, the first mode of transmission is preferably either a full-rate GSM mode or a half-rate GSM mode.

In a first advantageous embodiment of the invention, said first mode of transmission being of the half-rate type, a first quarter of a given first block being placed in a burst of an ith frame with a third quarter of a preceding first block, a second quarter of said given first block being placed in a burst of an (i+2)th frame with a fourth quarter of said preceding first block, a third quarter of said given first block being placed in a burst of an (i+4)th frame with a first quarter of a preceding first block, a fourth quarter of said given first block being placed in a burst of an (i+6)th frame with a second quarter of said preceding first block, when said second mode of transmission is selected, the change from said first mode of transmission to the second consists in, for each call, taking as the last burst transmitted in the first mode of transmission a burst in which are placed a fourth quarter of a given first block and a second quarter of the next first block, said next first block being considered by the receiver not to have been transmitted since the third and fourth quarters of said next first block are never transmitted, and in that, when said first mode of transmission is selected, the change from said second mode of transmission to the first consists in, for each call, taking as the first burst transmitted in the first mode of transmission a burst in which is placed a first quarter of a given first block.

In a second advantageous embodiment of the invention said first mode of transmission is again of the half-rate type and when said second mode of transmission is selected, the change from said first mode of transmission to the second consists in, for each call:

dividing a given second block in two;

placing in a burst corresponding to this call and which is the penultimate burst transmitted in the first mode of transmission a third quarter of a given first block and a first half of said given second block;

placing in a burst corresponding to this call and which is the last burst transmitted in the first mode of transmission a fourth quarter of said given first block and a second half of said given second block.

Preferably, when said first mode of transmission is selected, the change from said second mode of transmission to the first consists in, for each call:
    constructing an artificial first block;
    dividing a given second block in two;
    placing in a burst corresponding to this call and which is the penultimate burst transmitted in the second mode of transmission a first half of said given second block and a first quarter of said artificial first block;
    placing in a burst corresponding to this call and which is the last burst transmitted in the second mode of transmission a second half of said given second block and a second quarter of said given first block;
    placing in a burst corresponding to this call and which is the first burst transmitted in the first mode of transmission a third quarter of said artificial first block and a first quarter of a given first block;
    placing in a burst corresponding to this call and which is the second burst transmitted in the first mode of transmission a fourth quarter of said artificial first block and a second quarter of said given first block.

Accordingly, in the first and second embodiments the first mode of transmission is a half-rate GSM mode and the second mode of transmission is a half-rate "burst by burst ARQ" mode.

In the first advantageous embodiment of the invention, the change from one mode of transmission to the other is effected "brutally" and results in the loss of a first block (during a "change" of first block). In the second advantageous embodiment of the invention, on the other hand, the change from one mode of transmission to the other is effected "gently" since there is no loss of any first block (thanks to interleaving of first and second blocks on changing from one mode of transmission to the other).

Said data to be transmitted is advantageously speech data.

Preferably, the change from the first mode of transmission to the second inducing a transmission time shift enabling faster processing at the receiver, at the transmitter, a speech signal corresponding to said speech data is analyzed, and said transmission time shift is eliminated in a deferred manner according to said analysis of the speech signal, with the aim of minimizing disturbances of a speech signal reconstituted in the receiver due to said change from the first mode of transmission to the second.

Accordingly, on changing from the first mode of transmission to the second, the decision is taken to reduce the transmission time shift (this is also referred to as reducing the time delay). There is a transmission time shift because, in the first mode of transmission, a first block can be reconstituted and processed only after a time period corresponding to the reception of six frames and one time slot, whereas in the second mode of transmission, in the worst case scenario (i.e. if the second block must be retransmitted), a second block can be reconstituted after a time corresponding to the reception of two frames and one time slot (one time slot only, if the second block does not have to be retransmitted).

To reduce this time-delay without excessive disturbance to the quality of the call (i.e. the quality of the speech signal), the reduction of the time-delay is deferred to a period in which there is little variation of the speech signal, i.e. a period in which the elimination of a speech block is not very perceptible to those speaking.

Said analysis of a speech signal advantageously consists in determining spectral coefficients of said speech signal.

Said second blocks are advantageously obtained by the second encoding of said source blocks. Accordingly, error correction is obtained not only by the retransmission of the second block detected to have been received incorrectly but also by encoding/decoding. In other words, by encoding the wanted data, even in the second mode of transmission using the "burst by burst ARQ" technique, an additional level of correction is added and the reliability of the received data is improved. It is nevertheless clear that the encoding referred to here is less powerful than that used in the standard mode of transmission, since a (second) block must be able to fit entirely within a burst, rather than being divided between a plurality of successive bursts (like the first blocks).

Preferably, during operation in said first mode of transmission, the analysis of the quality of the transmission channel consists in determining at least one first information selected from:
    the number of bursts detected to have been received incorrectly;
    an estimate of the bit error rate;
    an estimate of the impulse response of the transmission channel;
    an estimate of the signal to noise ratio; and, during operation in said second mode of transmission, the analysis of the quality of the transmission channel consists in determining at least one second information selected from:
    the number of bursts retransmitted;
    the number of bursts retransmitted detected to have been received incorrectly;
    an estimate of the bit error rate;
    an estimate of the impulse response of the transmission channel;
    an estimate of the signal to noise ratio.

Preferably, during operation in said first mode of transmission or respectively said second mode of transmission, the selection of the second or respectively the first mode of transmission comprises a step of comparing the first or respectively second information representative of the quality of the transmission channel with at least one first or respectively second predetermined threshold.

Advantageously, during operation in said first mode of transmission, the second mode of transmission is selected if said first information representative of the quality of the transmission channel is below said predetermined first threshold, and, during operation in the second mode of transmission, the first mode of transmission is selected if said second information representative of the quality of the transmission channel is above said predetermined second threshold.

Advantageously, an indication of the change from the first mode of transmission to the second is transmitted over an auxiliary channel reserved for protocol data. In the case of a GSM system, one such auxiliary channel is an FACCH channel, for example.

An indication of the change from the second mode of transmission to the first is preferably placed in one of said available bursts.

Other features and advantages of the invention will emerge from a reading of the following description of one preferred embodiment of the invention given by way of illustrative and non-limiting example and from the accompanying drawings, in which:

The invention concerns a method of adapting the air interface (i.e. the physical and link layers (levels 1 and 2 of the ISO's OSI model)) in a mobile radio system enabling exchange of frames of data, and in particular of frames of speech data, using the TDMA (Time Division Multiple Access) technique. Each frame comprises N time slots, a burst of data being transmitted in each time slot, and each time slot being associated with a separate call between a mobile station and a base station.

Figure 1:
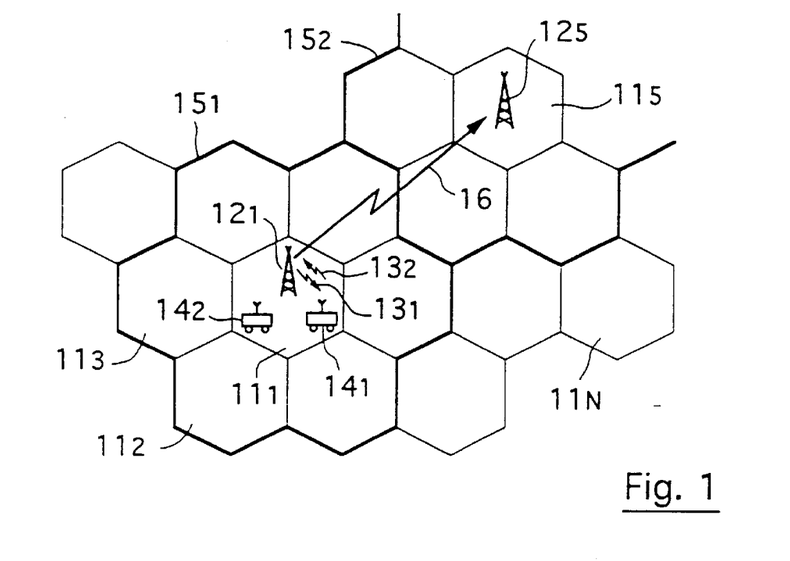
FIG. 1 is a diagrammatic representation of one example of a mobile radio system in which the method of the invention can be used.

FIG. 1 is a diagrammatic representation of a type of cellular network that is known in itself. The geographical territory covered by the mobile radio system is divided into cells $11_1$ through $11_n$. Each cell $11_1$ contains a base station $12_1$ capable of exchanging signal frames $13_1$, $13_2$ with a plurality of mobile stations $14_1$, $14_2$ moving around in said cell $11_1$.

Two adjoining cells $11_1$, $11_2$ use separate frequency bands so that there is no interference between the signals transmitted in the two cells. To be more precise, the allocation of frequencies is based on an organization of the cells into patterns $15_1$, $15_2$ each of seven cells. Within the same pattern, the frequencies allocated are different. They are re-used from one pattern $15_1$ to the other $15_2$, on the other hand. For example, the cell $11_5$ uses the same frequency as the cell $11_1$.

Figure 2:
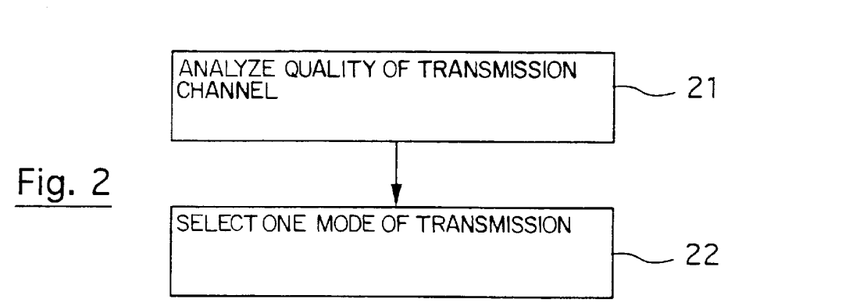
FIG. 2 is a flowchart of the principle of the method of the invention.

As shown by the flowchart in FIG. 2, the principle of the method of the invention is as follows: for each call between a mobile station $14_1$, $14_2$ and a base station $12_1$, $12_5$ via a transmission channel the quality of the transmission channel is analyzed (step 21) and one of at least two possible modes of transmission is selected (step 22) according to the result of the preceding analysis (step 21). In other words, the bursts of the same frame can be associated with different (first or second) modes of transmission since each burst of a frame corresponds to a separate call.

The two modes can differ in the manner in which, for a given call, the blocks of data to be transmitted are distributed in the bursts contained in the frames and in the manner of correcting transmission errors.

Figure 3:
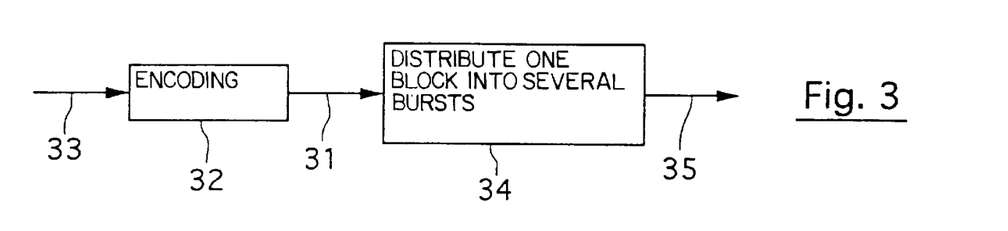
FIGS. 3 and 4 each show a respective different mode of transmission that can be selected when the method of the invention is used.

A first mode of transmission that can be selected in a standard mode shown in FIG. 3. In this standard mode the data 31 to be transmitted is organized into encoded blocks which are the result of encoding (step 32) wanted data 33 which is itself organized into source blocks. Each encoded block, which is therefore made up of encoded data (generally more than the wanted data), has a size greater than the capacity of (P-1) bursts 35, where P is an even number at least equal to 2. Consequently, the data 31 in the same encoded block is divided (i.e. interleaved) (step 34) between at least P bursts 35. In many instances P=2.

Transmission error correction consists in, at the receiver, deinterleaving (i.e. reconstituting the encoded blocks) followed by decoding (the encoded blocks reconstituted in this way). This first mode of transmission is more reliable if the encoding is more powerful (so that the amount of encoded data is large) and the depth of interleaving (i.e. the number of bursts between which the data from the encoded block is divided) is greater. Note that the depth of interleaving also corresponds to a number of frames between which an encoded block is distributed since, for a given call, each frame comprises a burst in the time slot reserved to that call.

This standard mode is therefore capable of working even if the transmission channel quality is poor (i.e. even if the data before deinterleaving and decoding contains a relatively large number of errors). On the other hand, this standard mode requires the sending of a relatively large amount of data because of the encoding, which is to the detriment of the resources available for the wanted data, and introduces time-delays, due to the interleaving.

A second mode of transmission that can be selected is a "burst by burst ARQ" mode of transmission. In this second mode of transmission, shown in FIG. 4, the data 36 to be transmitted is organized in blocks each having a size less than (or equal to) the content of P/2 burst(s) 37. Consequently, the data 36 from the same block is placed (step 38)—without interleaving it—in at most P/2 bursts 37.

Figure 4:
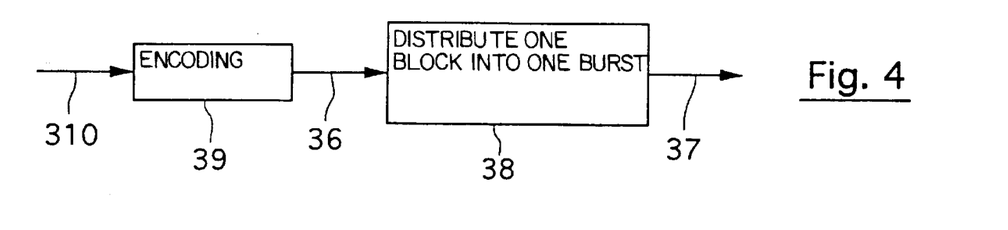

There are therefore at least P/2 burst(s) available compared to the first mode of transmission, and these bursts are used to retransmit bursts detected to have been received incorrectly.

Note that in the example shown in FIG. 4 the blocks of data 36 to be transmitted are obtained by encoding (step 39) wanted data 310. However, the invention also concerns the situation in which the wanted data 310 directly constitutes the data 36 to be transmitted. Generally, the data 36 to be transmitted can be produced by any form of processing, provided that the size of a block of data 36 to be transmitted is always less than the content of P/2 burst(s) 37.

In the second mode of transmission, transmission errors are corrected by retransmitting the bursts (and therefore the blocks, since a burst contains a block) detected to have been received correctly. Using this second mode of transmission economizes on transmission resources when the quality of the channel is good. In this case, the number of bursts to be retransmitted is small. This second mode of transmission also reduces the time-delays since there is no interleaving.

By dynamically selecting the more appropriate mode of transmission, depending on the quality of the transmission channel (i.e. the first mode of transmission if the quality is somewhat poor and the second if it is somewhat good), the method of the invention optimizes the use of resources and reduces the time-delays where possible.

The remainder of the description considers the case of a GSM (Global System for Mobile communications) type mobile radio system). It is nevertheless clear that the invention is not limited to this particular system but concerns more generally all mobile radio systems.

Figure 7:
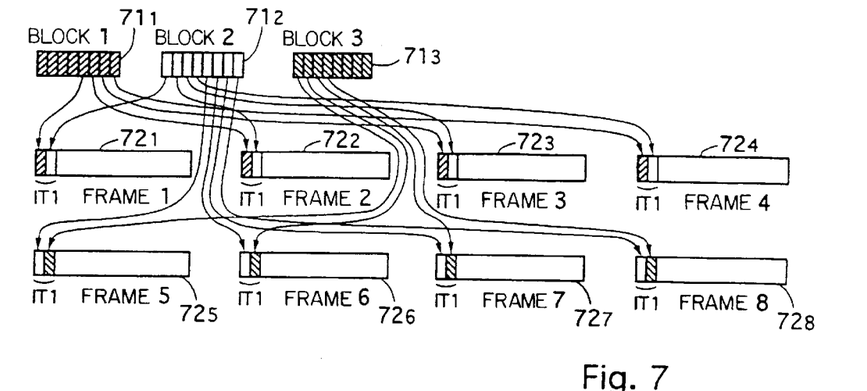
FIGS. 7, 8 and 9 each show one example of the distribution of data to be transmitted in bursts, respectively in the case of a full-rate GSM mode of transmission, a half-rate GSM mode of transmission and a half-rate "burst by burst ARQ" mode of transmission.
Figure 8:
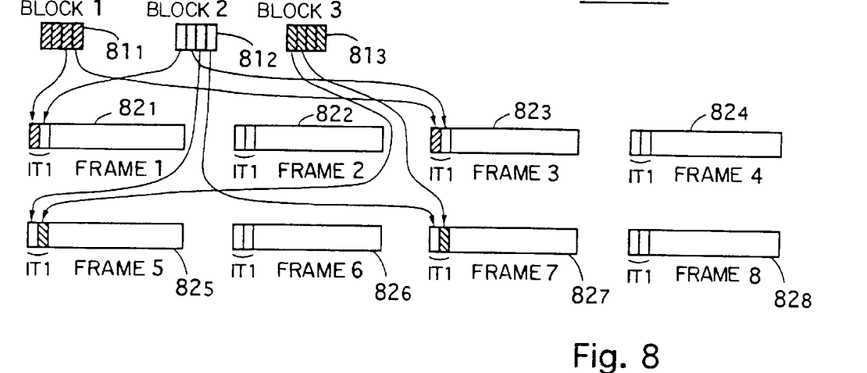

FIGS. 7 and 8 each show one example of distribution of data to be transmitted into bursts, respectively in the case of a full-rate GSM and a half-rate GSM first mode of transmission.

In the case of the full-rate GSM type (see FIG. 7), a first block ($71_1$–$71_3$) has a size substantially equal to the content of four bursts (i.e. four time slots; only the first time slot IT1 of each frame $72_1$ through $72_8$ is shown). The data of the same first block is divided between eight bursts, at the rate of approximately one eighth of the first block per burst. Thus in FIG. 7 the distribution is as follows:

a first eighth of the first block n°2 is placed in a burst of frame n°1 with a fifth eighth of the first block n°1, a second eighth of the first block n°2 is placed in a burst of frame n°2 with a sixth eighth of the first block n°1, a third eighth of the first block n°2 is placed in a burst of frame n°3 with a seventh eighth of the first block n°1, a fourth eighth of the first block n°2 is placed in a burst of frame n°4 with an eighth eighth of the first block n°1, a fifth eighth of the first block n°2 is placed in a burst of frame n°5 with a first eighth of the first block n°3, a sixth eighth of the first block n°2 is placed in a burst of frame n°6 with a second eighth of the first block n°3, a seventh eighth of the first block n°2 is placed in a burst of frame n°7 with a third eighth of the first block n°3, an eighth eighth of the first block n°2 is placed in a burst of frame n°8 with a fourth eighth of the first block n°3.

Figure 5:
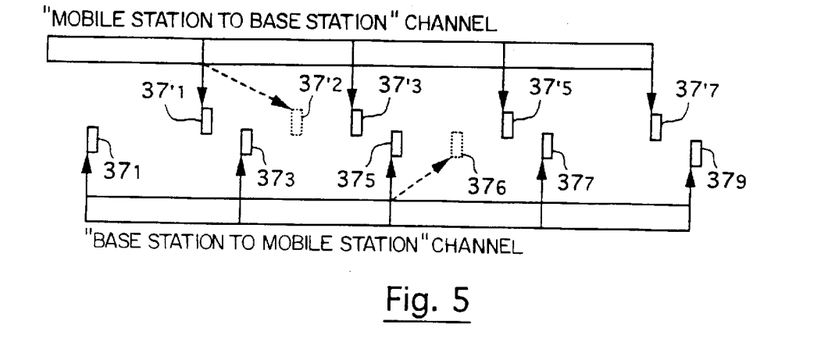
FIG. 5 is a simplified diagrammatic representation of half-rate operation of the mode of transmission shown in FIG. 4.
Figure 9:
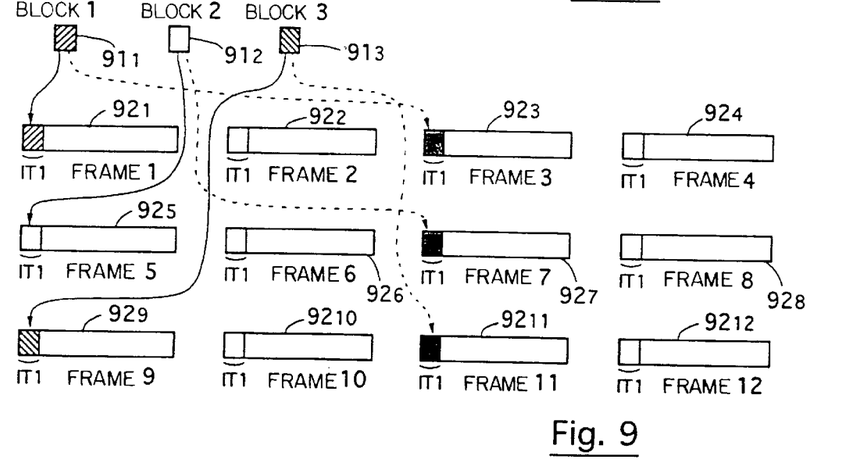

In the case of the half-rate GSM type (see FIG. 8), a first block ($81_1$–$81_3$) has a size substantially equal to the content of two bursts (i.e. two time slots; only the first time slot IT1 of each frame $82_1$ through $82_8$ is shown). The data from the same first block is divided between four bursts, at the rate of approximately one quarter of the first block per burst, and only one frame in two $82_1$, $82_3$, $82_5$, $82_7$ is used for the same call. Thus in the FIG. 8 example the distribution is as follows:

a first quarter of the first block n°2 is placed in a burst of frame n°1 with a third quarter of the first block n°1, a second quarter of the first block n°2 is placed in a burst of frame n°3 with a fourth quarter of the first block n°1, a third quarter of the first block n°2 is placed in a burst of frame n°5 with a first quarter of the first block n°3, a fourth quarter of the first block n°2 is placed in a burst of frame n°7 with a second quarter of the first block n°3, FIG. 5 is a simplified diagrammatic representation of the operation of one particular embodiment of the "burst by burst ARQ" mode of transmission (the second mode of transmission shown in FIG. 4), namely a half-rate embodiment. FIG. 9 shows in detail the distribution of the data to be transmitted in the bursts in this case of a half-rate "burst by burst ARQ" mode of transmission.

In the half-rate "burst by burst ARQ" mode of transmission (see FIG. 9) a second block ($91_1$ through $91_3$) has a size substantially equal to the content of a burst (i.e. a time slot; only the first time slot IT1 for each frame $92_1$ through $92_8$ is shown). The data from the same second block is all placed in the same burst and only one frame in two $92_1$, $92_3$, $92_5$, $92_7$, $92_9$, $92_{11}$ is used for the same call. In the FIG. 9 example the distribution is therefore as follows:

block n°1 is placed in a burst of frame n°1, block n°2 is placed in a burst of frame n°5, block n°3 is placed in a burst of frame n°9.

Bursts received incorrectly are retransmitted as follows:

if the burst of frame n°1 is received incorrectly, block n°1 is sent again in a burst of frame n°3, if the burst of frame n°5 is received incorrectly, block n°2 is sent again in a burst of frame n°7, if the burst of frame n°9 is received incorrectly, block n°3 is sent again in a burst of frame n°11.

FIG. 5 shows the two transmission channels between a base station and a mobile station, namely a "mobile station to base station" channel ("uplink") and a "base station to mobile station" channel ("downlink"). For simplicity, empty packets are not shown except for those used to retransmit a block detected to have been received incorrectly. The following discussion refers only to the bursts corresponding to the same call.

In this example, the first two bursts $37_1$, $37_3$ containing a block of data $51_1$, $51_2$ are transmitted correctly on the downlink. However, the third burst $37_5$ containing a block of data $51_3$ is not transmitted correctly. The receiver advises the sender of this and the latter resends the block $51_3$ in the burst $37_6$.

In the example given for the uplink, the first burst $37'_1$ is detected to have been received incorrectly and its content is then retransmitted in the next burst $37'_2$ without disturbing the transmission of the other bursts $37'_3$, $37'_5$, $37'_5$ containing blocks of data to be transmitted.

This embodiment of the half-rate second mode of transmission limits interference 16 due to the use of the same frequencies in different cells $11_1$, $11_5$. For one burst in two $92_3$, $92_7$, $92_{11}$ no signals are sent (except for a block that is retransmitted) and therefore there is no interference 16.

Figure 6:
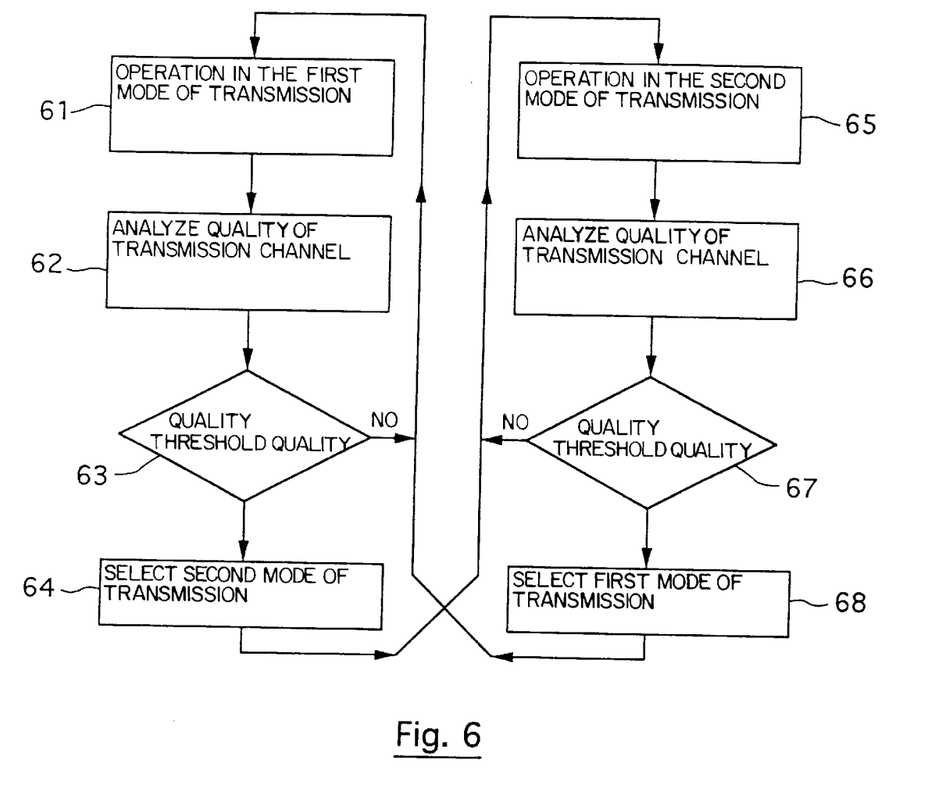
FIG. 6 is a flowchart of the method of the invention.

FIG. 6 is a flowchart of the method of the invention.

At a given time, for a given call, the system is assumed to be operating in the first mode of transmission (step 61). At regular time intervals, for example after transmission of a predetermined number of bursts, the quality of the transmission channel is analyzed (step 62) for the call in question. Following this analysis (step 62), the estimated quality is compared (step 63) to a predetermined quality threshold. If the estimated quality is below that predetermined quality threshold for the call in question the system continues to operate in the first mode of transmission (step 61). Otherwise the second mode of transmission is selected for this call (step 64) and operation in the second mode of transmission begins (step 65). When the system is operating in the second mode of transmission (step 65), the quality of the transmission channel is analyzed (step 66) at regular time intervals. After this analysis (step 66), the estimated quality is compared (step 67) with the aforementioned quality threshold. If the estimated quality is above or equal to the predetermined quality threshold, for this call the system continues to operate in the second mode of transmission (step 65). Otherwise, the first mode of transmission is selected (step 68) and, for the call in question, operation is thereafter in the first mode of transmission (step 61).

Various ways of achieving this change from one mode of transmission to the other are described below.

When the system is operating in the first mode of transmission (step 61), the analysis (step 62) of the quality of the transmission channel consists in determining the number of bursts detected to have been received incorrectly, for example. Comparing (step 63) the estimated quality of the channel to a predetermined quality threshold then amounts to comparing the number of packets detected to have been received incorrectly (as a percentage, i.e. for a given number of bursts received) to a predetermined threshold number. Note that the direction of the inequality is reversed (relative to that concerning the quality of the channel) since the number of bursts detected to have been received incorrectly is inversely proportional to the quality of the transmission channel. The change from the first mode of transmission to the second can be made, for example, when the percentage of bursts received incorrectly is below 1% (calculated for the last 500 bursts, for example, which takes 10 s in the case of the GSM system).

It is clear that in the case of the first mode of transmission there are many other ways to analyze the quality of the transmission channel. The following parameters may be used, for example: an estimate of the bit error rate, an estimate of the impulse response of the channel or an estimate of the signal to noise ratio.

When the system is operating in the second mode of transmission (step 65), the analysis (step 66) of the quality of the transmission channel consists in determining the number of bursts retransmitted, for example. Once again, the comparison (step 67) of the estimated quality of the channel to a predetermined quality threshold amounts to comparing the number of bursts retransmitted (as a percentage, for a given number of bursts transmitted) to a predetermined threshold number. The first mode of transmission is selected only if the number of bursts retransmitted is greater than the predetermined threshold number, i.e. if the estimated quality is below a predetermined threshold value (once again, the inequalities are reversed). The change from the second mode of transmission to the first can take place, for example, when at least one burst in six has to be retransmitted or if the number of bursts retransmitted detected to have been received incorrectly is greater than 3% (calculated over the last 60 bursts, for example, which takes 1.2 s in the case of the GSM system).

In the case of the second mode of transmission, the quality of transmission can also be analyzed by measuring the following parameters: the number of bursts retransmitted detected to have been received incorrectly, an estimate of the bit error rate, an estimate of the impulse response of the transmission channel or an estimate of the signal to noise ratio.

The indication of the change from the first mode of transmission to the second is transmitted over an auxiliary channel reserved for protocol data, for example. This can be the FACCH channel in the case of the GSM system, for example. The indication of the change from the second mode of transmission to the first is placed in an available burst $37_2$, $37_4$, $37_6$, $37_8$ for example.

Consider now the change from one mode of transmission to the other, in the particular case in which the first mode of transmission is a half-rate GSM mode (see FIG. 8) and the second mode of transmission is a half-rate "burst by burst ARQ" mode (see FIG. 9).

A first solution proposed by the invention is as follows:

When the second mode of transmission is selected, changing from the first mode of transmission to the second, taking as the last burst transmitted in the first mode of transmission a burst in which are placed a fourth quarter of a given first block and a second quarter of the next first block. Consequently, the next first block is considered by the receiver not to have been transmitted since the third and fourth quarters of this next first block are never transmitted. In other words, a block is lost.

When said first mode of transmission is selected, changing from the second mode of transmission to the first, taking as the first burst transmitted in the first mode of transmission a burst in which is placed a first quarter of a given first block. The receiver then creates a first block artificially in order to fill in the transmission time-delay due to the change of mode of transmission.

This first solution is somewhat "brutal" since it leads to a loss of block in one direction and the addition of a block in the other direction.

A second solution proposed by the invention is more flexible. In this second solution, when the second mode of transmission is selected, the change from the first mode of transmission to the second consists in, for each call:

dividing a given second block in two;

placing in a burst corresponding to this call and which is the penultimate burst transmitted in the first mode of transmission a third quarter of a given first block and a first half of said given second block;

placing in a burst corresponding to this call and which is the last burst transmitted in the first mode of transmission a fourth quarter of said given first block and a second half of said given second block.

There is therefore a "flexible" change from the first mode of transmission to the second since the last "first block" is interleaved with the first "second block". In other words, no block is lost on changing from the first mode of transmission to the second.

In this second solution, when the first mode of transmission is selected, the change from the second mode of transmission to the first consists in, for each call:

constructing an artificial first block;

dividing a given second block in two;

placing in a burst corresponding to this call and which is the penultimate burst transmitted in the second mode of transmission a first half of said given second block and a first quarter of said artificial first block;

placing in a burst corresponding to this call and which is the last burst transmitted in the second mode of transmission a second half of said given second block and a second quarter of said given first block;

placing in a burst corresponding to this call and which is the first burst transmitted in the first mode of transmission a third quarter of said artificial first block and a first quarter of a given first block;

placing in a burst corresponding to this call and which is the second burst transmitted in the first mode of transmission a fourth quarter of said artificial first block and a second quarter of said given first block.

There is therefore a "flexible" change from the second mode of transmission to the first since the last "second block" is interleaved with a first "first block" constructed artificially by the transmitter (for example by interpolation of speech).

The invention also proposes to eliminate the transmission time shift (i.e. to reduce the time-delay) induced by the change from the first mode of transmission to the second.

At the transmitter, for example, a speech signal corresponding to said speech data is analyzed and the elimination of the time-delay is deferred on the basis of this analysis of the speech signal, so as to minimize disturbances of a speech signal reconstituted at the receiver due to the change from the first mode of transmission to the second. The analysis of a speech signal consists in determining spectral coefficients of the speech signal, for example, and deducing therefrom the periods of relative stability of the speech signal. The elimination (or reduction) of the time-delay, which consists in eliminating a block, is then carried out as soon as any such period is detected.

We claim:

1. A method of adapting an air interface, in a mobile radio system conveying, between at least one mobile station and at least one base station frames each made up of N time slots, a burst of data being transmitted in each time slot, and each time slot being associated with a separate call between a mobile station and a base station, said system providing a first mode of transmission in which the data of a call to be transmitted is organized in first blocks obtained by first encoding of source blocks, each of said first blocks having a size greater than the content of (P−1) burst(s) where P is an even number at least equal to 2, the data of a same first block being divided between at least P bursts, wherein said system provides a second mode of transmission in which said data of a call to be transmitted is organized in second blocks each having a size less than or equal to the content of P/2 burst(s), the data of a same second block being divided between at most P/2 burst(s), at least P/2 burst(s) being available relative to said first mode of transmission, and an automatic retransmission request mechanism being implemented to retransmit in said available bursts second blocks detected to have been received incorrectly, and, for each call between a mobile station and a base station via a transmission channel, the quality of said transmission channel is analyzed and one of said modes of transmission is selected according to said analysis of said quality of said transmission channel, said second mode of transmission necessitating a level of quality of said transmission channel greater than that necessitated by said first mode of transmission.

2. The method claimed in claim 1 wherein said mobile radio system is of a GSM (Global System for Mobile communications) type, and said second mode of transmission is of a half-rate type, said second block having a size less than or equal to the content of a burst, only one frame in two being used for a given call.

3. The method claimed in claim 2 wherein the data of the same first block is distributed between at least four bursts, and the data of the same second block is in the same burst.

4. The method claimed in claim 3 wherein said first mode of transmission is selected from:
   a full-rate type first mode of transmission in which a first block has a size substantially equal to the content of four bursts, the data of the same first block being distributed between eight bursts, at the rate of approximately one eighth of the first block per burst; and
   a half-rate type first mode of transmission in which a first block has a size substantially equal to the content of two bursts, the data of the same first block being divided into four bursts, at the rate of approximately one quarter of said first block per burst, only one frame in two being used for the same call.

5. The method claimed in claim 4, wherein said first mode of transmission is of the half-rate type, a first quarter of a given first block is placed in a burst of an ith frame with a third quarter of a preceding first block, a second quarter of said given first block is placed in a burst of an (i+2)th frame with a fourth quarter of a preceding first block, a third quarter of said given first block is placed in a burst of an (i+4)th frame with a first quarter of a preceding first block, and a fourth quarter of said given first block is placed in a burst of an (i+6)th frame with a second quarter of said preceding first block, when said second mode of transmission is selected, the change from said first mode of transmission to the second consists in, for each call, taking as the last burst transmitted in said first mode of transmission a burst in which are placed a fourth quarter of a given first block and a second quarter of the next first block, said next first block being considered by the receiver not to have been transmitted since the third and fourth quarters of said next first block are never transmitted, and, when said first mode of transmission is selected, the change from said second mode of transmission to the first consists in, for each call, taking as the first burst transmitted in said first mode of transmission a burst in which is placed a first quarter of a given first block.

6. The method claimed in claim 4, wherein said first mode of transmission is of the half-rate type, a first quarter of a given first block is placed in a burst of an ith frame with a third quarter of a preceding first block, a second quarter of said given first block is placed in a burst of an (i+2)th frame with a fourth quarter of said preceding first block, a third quarter of said given first block is placed in a burst of an (i+4)th frame with a first quarter of a next first block, and a fourth quarter of said given first block is placed in a burst of an (i+6)th frame with a second quarter of said next block, when said second mode of transmission is selected, the change from said first mode of transmission to the second consists in, for each call:
   dividing a given second block in two;
   placing in a burst corresponding to this call and which is the penultimate burst transmitted in the first mode of transmission a third quarter of a given first block and a first half of said given second block; and
   placing in a burst corresponding to this call and which is the last burst transmitted in the first mode of transmission a fourth quarter of said given first block and a second half of said given second block.

7. The method claimed in claim 6 wherein, when said first mode of transmission is selected, the change from said second mode of transmission to the first consists in, for each call:
   constructing an artificial first block;
   dividing a given second block in two;
   placing in a burst corresponding to this call and which is the penultimate burst transmitted in said second mode of transmission a first half of said given second block and a first quarter of said artificial first block;
   placing in a burst corresponding to this call and which is the last burst transmitted in said second mode of transmission a second half of said given second block and a second quarter of said given first block;
   placing in a burst corresponding to this call and which is the first burst transmitted in said first mode of transmission a third quarter of said artificial first block and a first quarter of a given first block; and
   placing in a burst corresponding to this call and which is the second burst transmitted in said first mode of transmission a fourth quarter of said artificial first block and a second quarter of said given first block.

8. The method claimed in claim 1 wherein said data to be transmitted is speech data.

9. The method claimed in claim 8 wherein the change from said first mode of transmission to the second induces a transmission time shift enabling faster processing at the receiver, at the transmitter, a speech signal corresponding to said speech data is analyzed, and said transmission time shift is eliminated in a deferred manner according to said analysis of said speech signal, with the aim of minimizing disturbances of a speech signal reconstituted in the receiver due to said change from said first mode of transmission to the second.

10. The method claimed in claim 9 wherein said analysis of a speech signal consists in determining spectral coefficients of said speech signal.

11. The method claimed in claim 1 wherein said second blocks are obtained by a second encoding of said source blocks.

12. The method claimed in claim 1 wherein:
   during operation in said first mode of transmission, the analysis of the quality of said transmission channel consists in determining at least one first information selected from:
   the number of bursts detected to have been received incorrectly;
   an estimate of the bit error rate (BER);

an estimate of the impulse response of said transmission channel; and an estimate of the signal to noise ratio; and during operation in said second mode of transmission, said analysis of the quality of said transmission channel consists in determining at least one second information selected from:

the number of bursts retransmitted;

the number of bursts retransmitted detected to have been received incorrectly)

an estimate of the bit error rate (BER);

an estimate of the impulse response of said transmission channel; and an estimate of the signal to noise ratio.

13. The method claimed in claim 12 wherein, during operation in said first mode of transmission or respectively said second mode of transmission, the selection of said second or respectively said first mode of transmission comprises a step of comparing the first or respectively second information representative of the quality of said transmission channel with at least one first or respectively second predetermined threshold.

14. The method claimed in claim 13 wherein, during operation in said first mode of transmission, said second mode of transmission is selected if said first information representative of the quality of said transmission channel is below said predetermined first threshold, and, during operation in said second mode of transmission, said first mode of transmission is selected if said second information representative of the quality of said transmission channel is above said predetermined second threshold.

15. The method claimed in claim 1 wherein an indication of a change from said first mode of transmission to the second is transmitted over an auxiliary channel reserved for protocol data.

16. The method claimed in claim 13 wherein an indication of a change from said second mode of transmission to the first is placed in one of said available bursts.

* * * * *